United States Patent
Okuzawa et al.

(10) Patent No.: US 7,945,574 B2
(45) Date of Patent: May 17, 2011

(54) REPRODUCING APPARATUS, REPRODUCING METHOD, AND REPRODUCING PROGRAM

(75) Inventors: Nozomu Okuzawa, Hyogo (JP); Hiroyuki Kikkoji, Tokyo (JP)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 11/517,376

(22) Filed: Sep. 8, 2006

(65) Prior Publication Data

US 2007/0061859 A1    Mar. 15, 2007

(30) Foreign Application Priority Data

Sep. 12, 2005    (JP) ................................. 2005-264257

(51) Int. Cl.
*G06F 7/00*    (2006.01)
(52) U.S. Cl. ..................................................... 707/758
(58) Field of Classification Search .................. 707/6
See application file for complete search history.

(56) References Cited

U.S. PATENT DOCUMENTS

| | | | | |
|---|---|---|---|---|
| 5,974,503 A | * | 10/1999 | Venkatesh et al. | 711/114 |
| 6,031,989 A | * | 2/2000 | Cordell | 717/109 |
| 6,066,792 A | * | 5/2000 | Sone | 84/609 |
| 6,389,467 B1 | * | 5/2002 | Eyal | 709/223 |
| 6,564,380 B1 | * | 5/2003 | Murphy | 725/86 |
| 2004/0068536 A1 | * | 4/2004 | Demers et al. | 709/201 |
| 2006/0080171 A1 | * | 4/2006 | Jardins et al. | 705/14 |
| 2006/0173825 A1 | * | 8/2006 | Hess et al. | 707/3 |
| 2006/0213976 A1 | * | 9/2006 | Inakoshi et al. | 235/380 |
| 2006/0230021 A1 | * | 10/2006 | Diab et al. | 707/3 |

FOREIGN PATENT DOCUMENTS

JP    2002-215571    8/2002

OTHER PUBLICATIONS

Keep Playing, Boutell.com, available online at www.boutell.com/newfaq/creating/keepplaying.html, Nov. 11, 2006.*

* cited by examiner

*Primary Examiner* — Tony Mahmoudi
*Assistant Examiner* — Jensen Hu
(74) *Attorney, Agent, or Firm* — Oblon, Spivak, McClelland, Maier & Neustadt, L.L.P.

(57) ABSTRACT

Disclosed herein is a reproducing apparatus including: a reproduction unit configured to reproduce content data linked to a first item being selected; a selection unit configured to select a second item in response to a request to select the second item, the request being input by a user operating an operation input unit; a determination unit configured to determine whether there exists content data linked to the second item; and a reproduction control unit configured to control reproduction of content data.

13 Claims, 12 Drawing Sheets

| GENRE SELECTION BUTTONS 76 | BUTTON-LINKED MUSIC INFORMATION | |
|---|---|---|
| JAPANESE MUSIC SELECTION BUTTON 76A | ···/○×△/abcd.mp3 | 21Aba |
| WESTERN MUSIC SELECTION BUTTON 76B | ···/□○○/efgh.mp3 | 21Abb |
| JAPANESE MUSIC RANKING SELECTION BUTTON 76C | ···/○×△/abcd.mp3 | 21Abc |
| NEW RELEASE SELECTION BUTTON 76D | ···/××△/ijkl.mp3 | 21Abd |
| JAZZ SELECTION BUTTON 76E | | |

21Ab

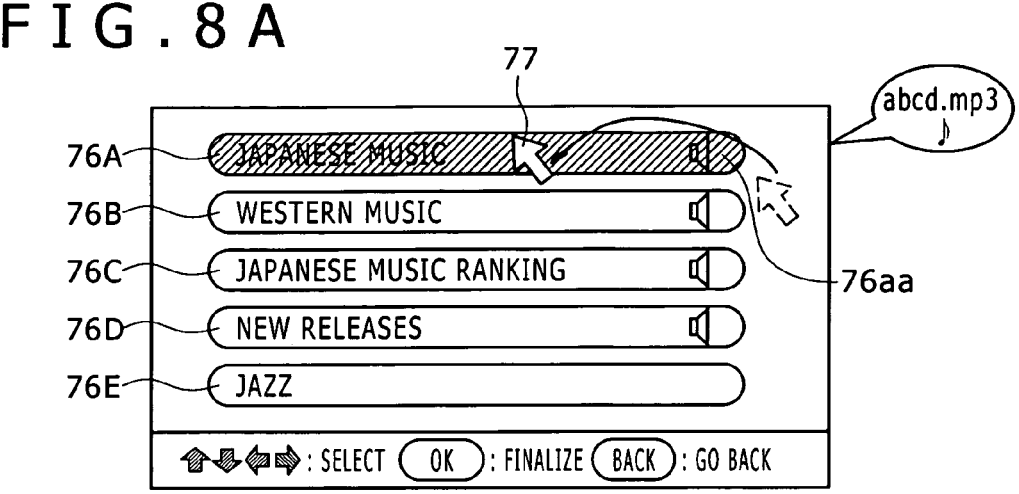
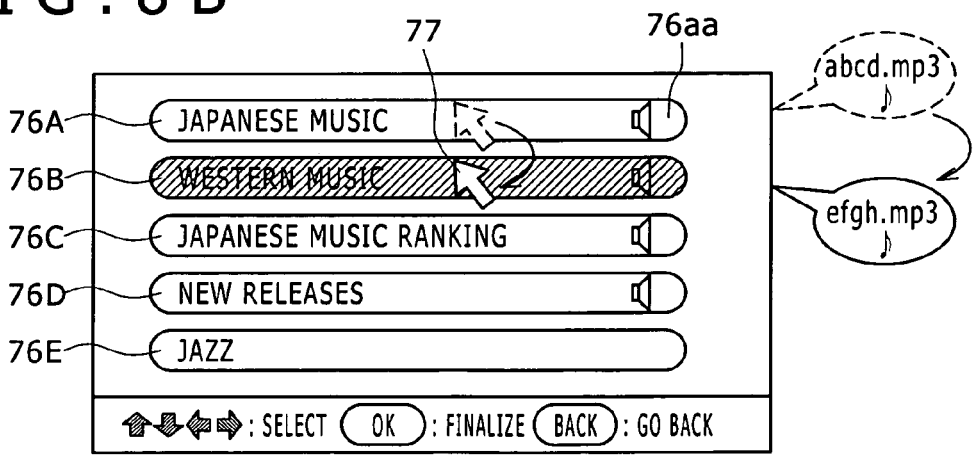
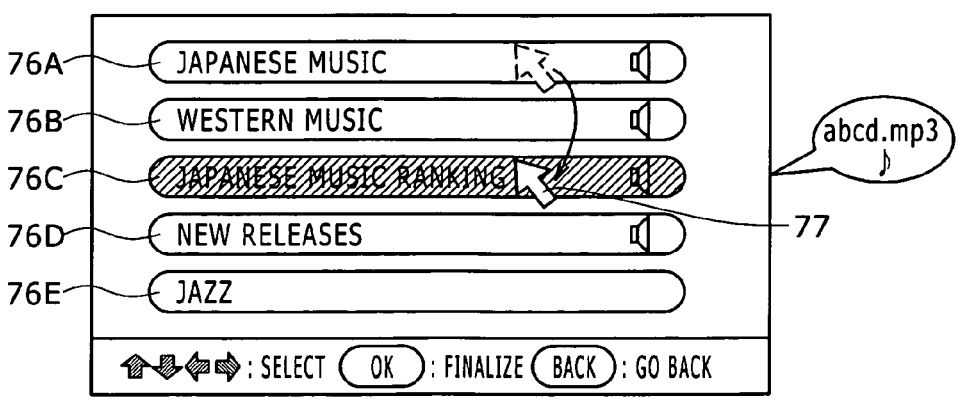

REPRODUCING APPARATUS, REPRODUCING METHOD, AND REPRODUCING PROGRAM

CROSS REFERENCES TO RELATED APPLICATIONS

The present invention contains subject matter related to Japanese Patent Application JP 2005-264257 filed with the Japanese Patent Office on Sep. 12, 2005, the entire contents of which being incorporated herein by reference.

BACKGROUND OF THE INVENTION

1. Field of the Invention

The present invention relates to a reproducing apparatus, a reproducing method, and a reproducing program. More particularly, the invention relates to a data storing and reproducing apparatus for reproducing music data delivered over networks.

2. Description of the Related Art

Typical data storing and reproducing apparatuses such as personal computers display web pages in response to the user's operations. If there is music data linked to a web page to be viewed, the apparatus automatically reproduces the music data while the page is being displayed. The related art is disclosed illustratively in Japanese Patent Laid-open No. 2002-215571.

SUMMARY OF THE INVENTION

The above-outlined type of data storing and reproducing apparatus was generally arranged to reproduce from the beginning the music data linked to a given screen upon transition thereto from another screen having been displayed. The apparatus automatically started reproducing the music data from the beginning upon transition to the second screen from the first even if the same music data was linked to the two screens. In such cases, the user had to endure listening to the same music data again from the beginning upon each screen transition.

The present invention has been made in view of the above circumstances and provides a reproducing apparatus, a reproducing method, and a reproducing program for continuously reproducing the same content data linked to any two items upon transition from one to the other.

In carrying out the present invention and according to one embodiment thereof, there is provided a reproducing method including the steps of: reproducing content data linked to a first item being selected; selecting a second item in response to a request to select the second item, the request being input by a user operating an operation input unit; and determining whether there exists content data linked to the second item. The method further includes a step of controlling reproduction of content data in such a manner that if content data is found linked to the second item in the determining step, then information about the content data linked to the first item is compared with information about the content data linked to the second item, the reproduction controlling step further causing the content data linked to the first item to be reproduced continuously if there is a match between the information about the content data linked to the first item and the information about the content data linked to the second item.

Where the reproducing method of the present invention is in use, the content data linked to the currently selected first item may be found to be the same as the content data linked to the second item upon transition from the first item to the second item. In that case, the content data linked to the first item is reproduced continuously according to the inventive method.

According to another embodiment of the present invention, there is provided a reproducing apparatus including a reproduction unit, a selection unit, a determination unit, and a reproduction control unit. The reproduction unit is configured to reproduce content data linked to a first item being selected. The selection unit is configured to select a second item in response to a request to select the second item, the request being input by a user operating an operation input unit. The determination unit is configured to determine whether there exists content data linked to the second item. The reproduction control unit is configured to control reproduction of content data in such a manner that if content data is found linked to the second item by the determination unit, then information about the content data linked to the first item is compared with information about the content data linked to the second item, the reproduction control unit further causing the content data linked to the first item to be reproduced continuously if there is a match between the information about the content data linked to the first item and the information about the content data linked to the second item.

Where the reproducing apparatus of the present invention is in use, it might happen that the content data linked to the currently selected first item is found the same as the content data linked to the second item upon transition from the first item to the second item. In that case, the content data linked to the first item is reproduced continuously by the inventive apparatus.

According to a further embodiment of the present invention, there is provided a reproducing program for causing a computer to execute a procedure including the steps of: reproducing content data linked to a first item being selected; selecting a second item in response to a request to select the second item, the request being input by a user operating an operation input unit; and determining whether there exists content data linked to the second item. The reproducing program further includes a step of controlling reproduction of content data in such a manner that if content data is found linked to the second item in the determining step, then information about the content data linked to the first item is compared with information about the content data linked to the second item, the reproduction controlling step further causing the content data linked to the first item to be reproduced continuously if there is a match between the information about the content data linked to the first item and the information about the content data linked to the second item.

Where the reproducing program of the present invention is in use, the content data linked to the currently selected first item may turn out to be the same as the content data linked to the second item upon transition from the first item to the second item. In such a case, the content data linked to the first item is reproduced continuously in accordance with the inventive program.

Where any one of the reproducing method, reproducing apparatus, and reproducing program according to the present invention is in use, a check is made to determine whether the content data linked to the currently selected first item matches with the content data linked to the second item upon transition from the first item to the second item. In that case, the inventive arrangements allow the content data linked to the first item to be reproduced continuously, thereby implementing the method, the apparatus, and the program envisaged by the present invention.

BRIEF DESCRIPTION OF THE DRAWINGS

Further objects and advantages of the present invention will become apparent upon a reading of the following description and appended drawings in which:

FIGS. 8A, 8B and 8C are schematic views explanatory of focused positions and reproduced music data;

DETAILED DESCRIPTION OF THE PREFERRED EMBODIMENTS

Preferred embodiments of the present invention will now be described with reference to the accompanying drawings.

(1) Overview

One embodiment of the present invention is described below by referring to FIG. 1. This embodiment will be explained first in outline and then in detail.

Figure 1:
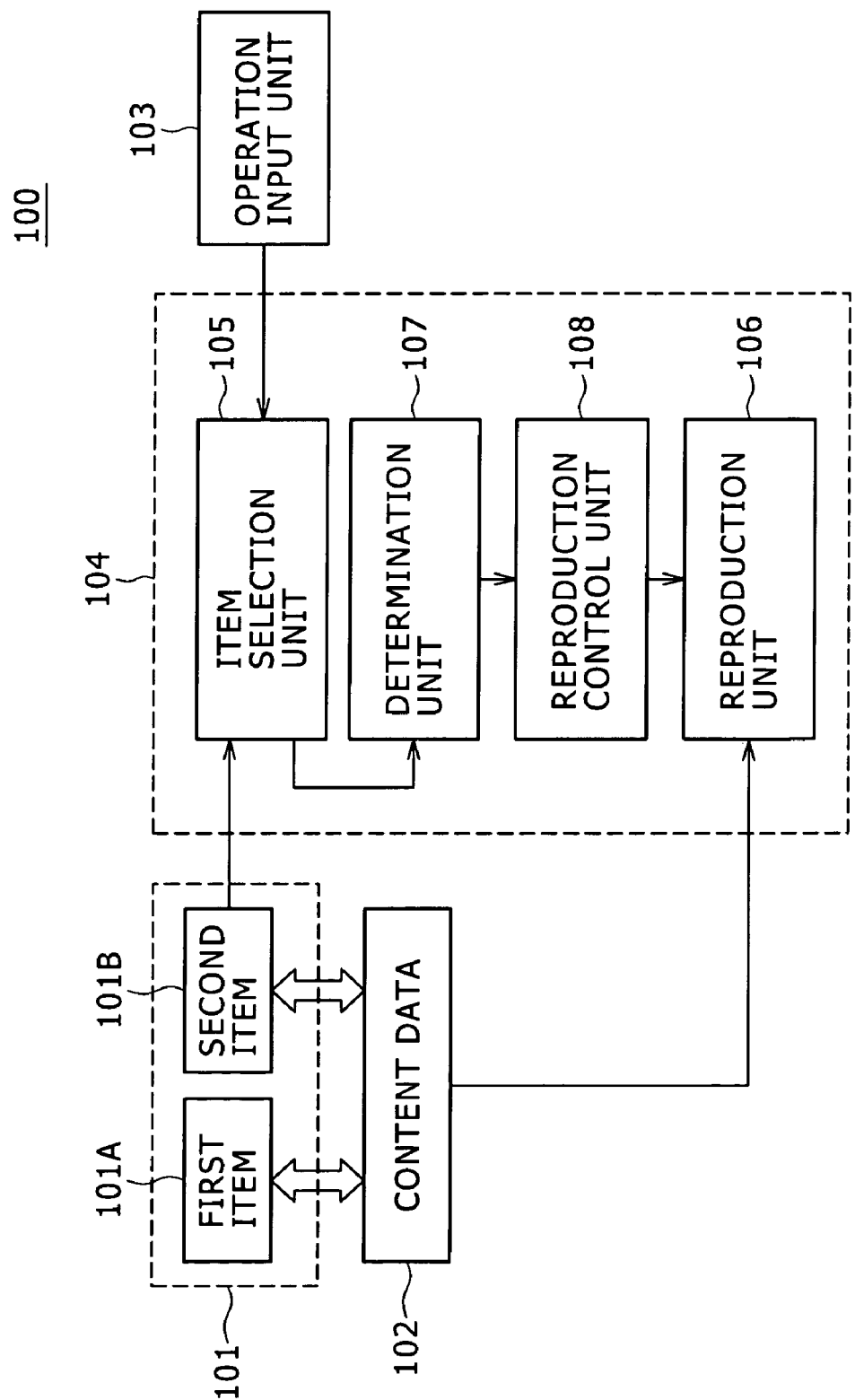
FIG. 1 is a block diagram outlining a content data reproduction system.

In FIG. 1, reference numeral 100 stands for a content data reproduction system as a whole. The content data reproduction system 100 includes items 101, content data 102 linked to the items 101, an operation input unit 103 that issues a request to select an appropriate item 101 in response to the user's operation, and a reproducing apparatus 104 that selects and reproduces the item 101 in keeping with the request.

In the reproducing apparatus 104, an item selection unit 105 selects one of items 101A and 101B in response to a selection request coming from the operation input unit 103.

A reproduction unit 106 in the reproducing apparatus 104 reproduces the content data 102 linked to the item 101 selected by the item selection unit 105.

A determination unit 107 in the reproducing apparatus 104 checks to determine whether or not any content data 102 is linked to the item 101B which is selected by the item selection unit 105 as the next item different from the currently selected item 101A, while the content data 102 linked to the item 101A is being reproduced by the reproduction unit 106.

After the determination unit 107 has detected any content data 102 linked to the item 101B, the reproduction control unit 108 in the reproducing apparatus 104 compares information about the newly detected content data 102 with information about the currently reproduced content data 102. If the comparison results in a match, then the reproduction control unit 108 causes the currently reproduced content data 102 to be reproduced continuously.

(2) Music Data Delivery System

Figure 2:
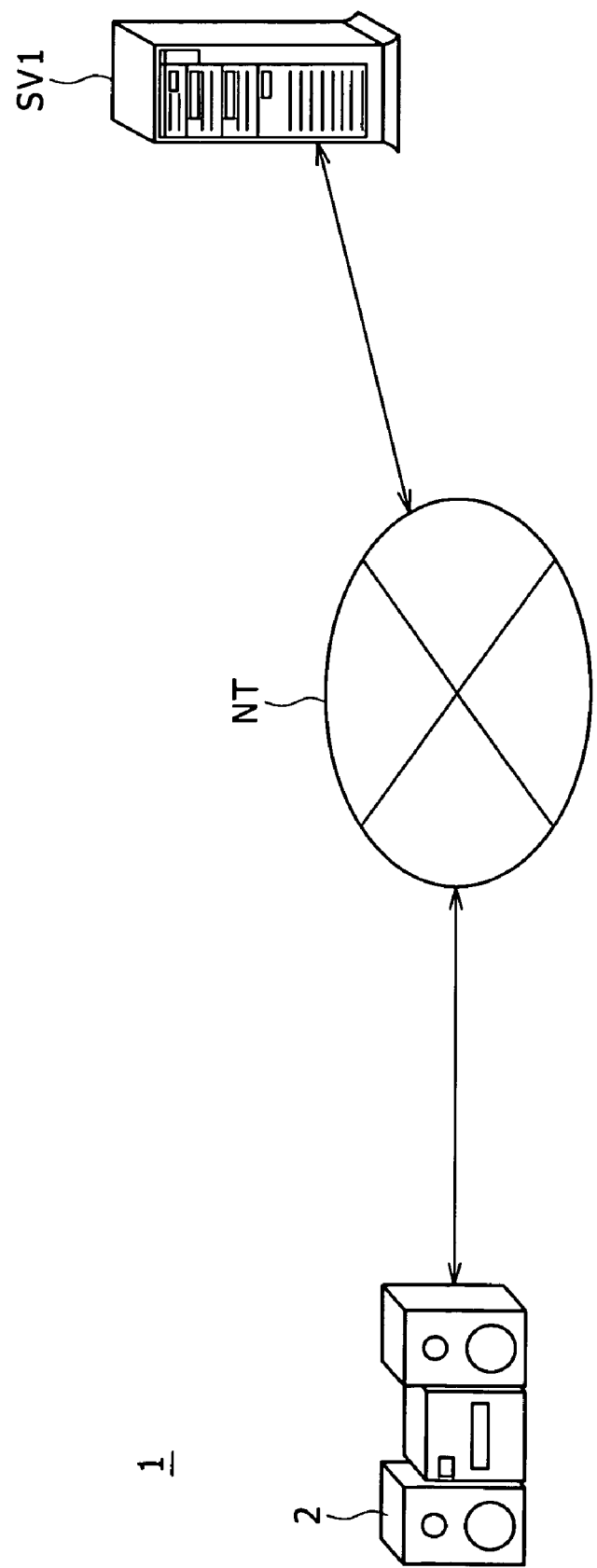
FIG. 2 is a schematic view showing an overall configuration of a music data delivery system.

In FIG. 2, reference numeral 1 denotes a music data delivery system as a whole. The music data delivery system 1 is constituted by the inventive data storing and reproducing apparatus 2 being connected to a music data distribution server SV1 over a network NT.

In the above setup, the music data distribution server SV1 may distribute music data to the data storing and reproducing apparatus 2 in such formats as ATRAC3 (Adaptive Transform Acoustic Coding 3), AAC (Advanced Audio Coding), WMA (Windows (registered trademark) Media Audio), realAUDIO G2 Music Codec, and MP3 (MPEG Audio Layer-3).

Figure 3:
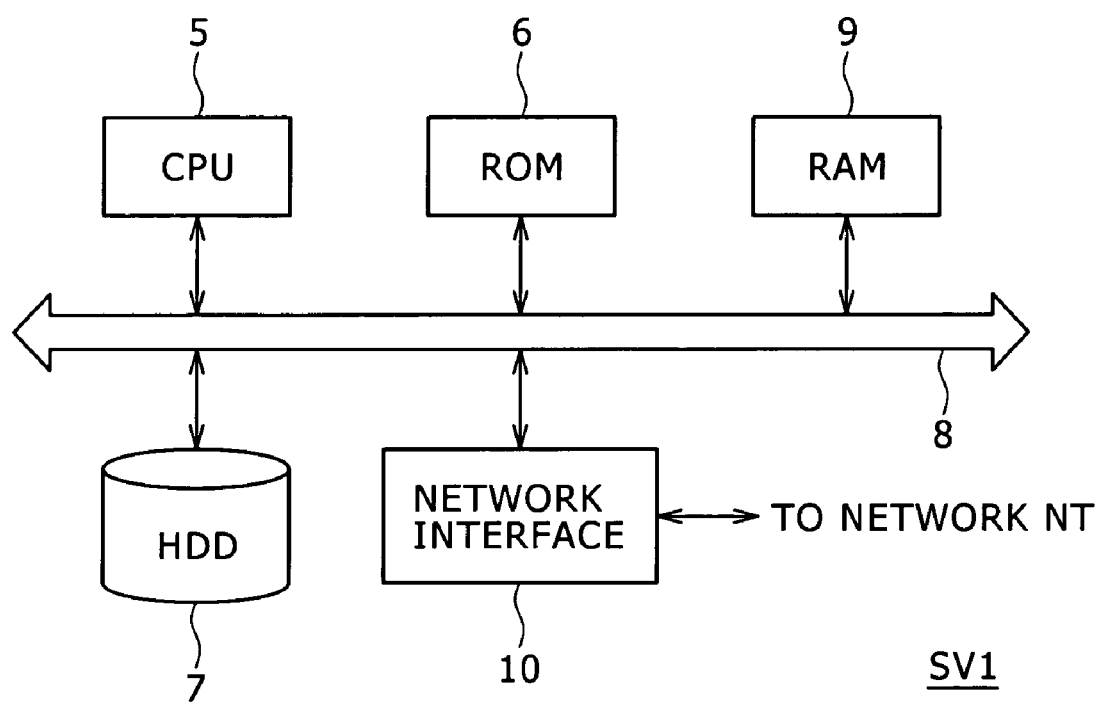
FIG. 3 is a block diagram showing a structure of a music data distribution server.

Described below with reference to FIG. 3 is a hardware structure of hardware circuit blocks making up the music data distribution server SV1. In the music data distribution server SV1, a CPU (central processing unit) 5 providing overall control loads diverse programs such as the basic program and application software from a ROM (read only memory) 6 or a hard disk drive 7 into a RAM (random access memory) 9 via a bus 8 as needed. By carrying out the suitable programs loaded into the RAM 9, the CPU 5 communicates with the data storing and reproducing apparatus 2 through a network interface 10. With such connection established with the data storing and reproducing apparatus 2, the CPU 5 performs various processes of music data distribution with regard to the connected apparatus 2.

In the above setup, the hard disk drive 7 holds numerous pieces of music data that can be downloaded (i.e., distributed) to the data storing and reproducing apparatus 2.

Figure 4:
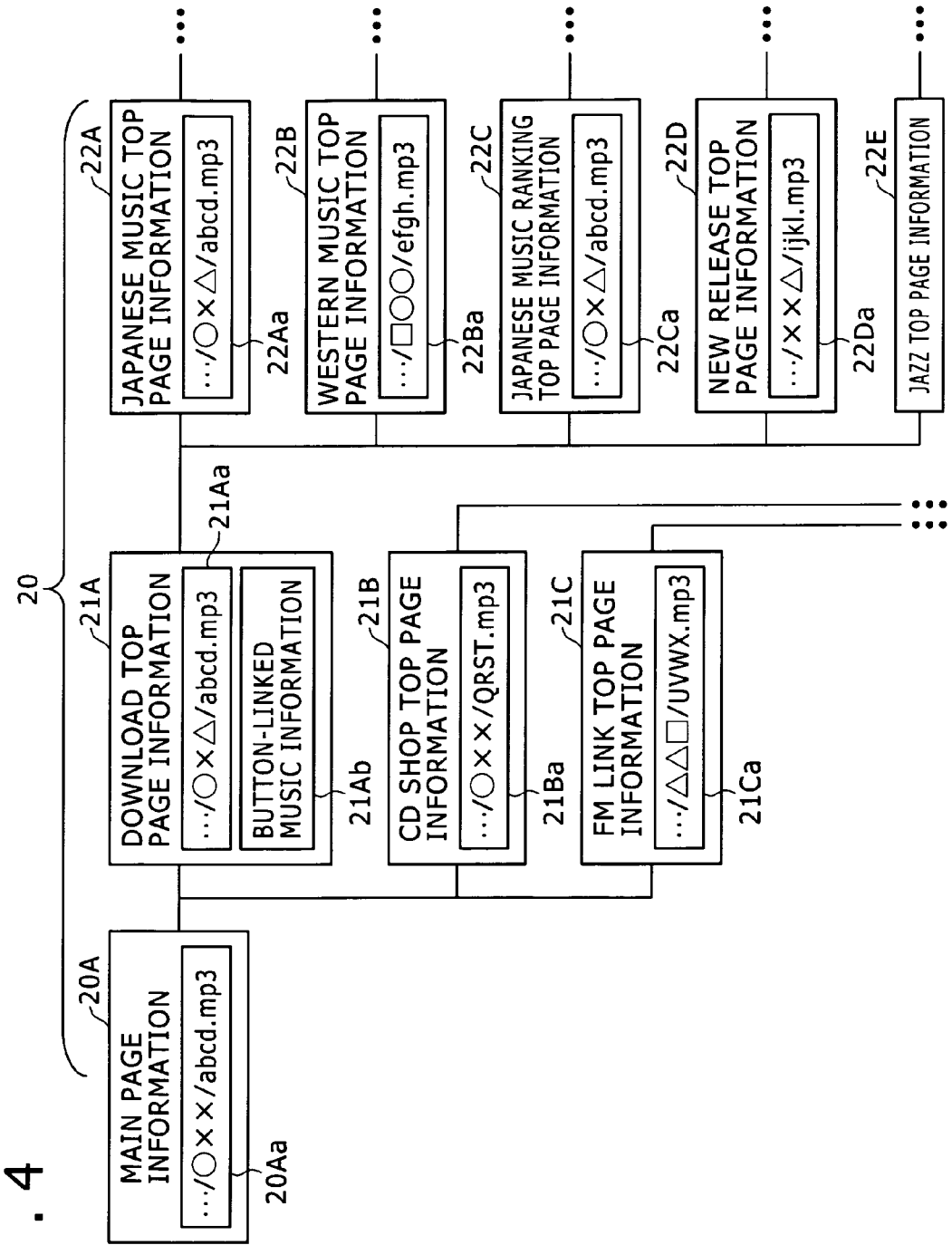
FIG. 4 is a schematic view showing a structure of web page information.

In addition, as shown in FIG. 4, the hard disk drive 7 retains information regarding a plurality of web pages. On the hard disk drive 7, the information 20 about these web pages is linked to network addresses representing those locations on the network NT where these web pages are located (i.e., the addresses are URL's indicating where the selected page information is availably located).

The web page information 20 is described illustratively in XML (extensible Markup Language). On a page screen that allows pieces of music data to be selected by genre, by artist, etc., the web page information 20 is made up of various kinds of screen structure information including button information used to display selection buttons, as well as network addresses indicative of the web pages linked to the button information. The web page information 20 further includes specific button information that may be linked to any of the components of the button information 20. When the specific button information is selected by the data storing and reproducing apparatus 2, the web page information 20 causes the selected specific button information to be displayed.

Furthermore, the web page information 20 includes information 20A$a$ through 22D$a$ indicative of the network addresses where the music data linked to the information 20 is located (the information will be called the page-linked music information hereunder); and information 20A$b$ representative of the network addresses for the music data linked to the button information (the information will be called the button-linked music information hereunder). In FIG. 4, the button-linked music information 20A$b$ is included in download top page information 21A.

When the data storing and reproducing apparatus 2 requests transmission of the web page information 20, the CPU 5 retrieves main page information 20A as the highest-layer part of the web page information 20 from the hard disk drive 7. The retrieved main page information 20 is sent to the data storing and reproducing apparatus 2 through the network interface 10.

It might happen that the data storing and reproducing apparatus 2 requests transmission of selected page information 21A through 21C on lower levels as well as selected page information 22A through 22E on still lower levels in accordance with selected page addresses included in the main page information 20A. In that case, the CPU 5 retrieves the corresponding web page information 20 from the hard disk drive 7 and sends the retrieved information to the data storing and reproducing apparatus 2 through the network interface 10.

With the web page information 20 delivered as requested by the data storing and reproducing apparatus 2, the apparatus 2 may further request transmission of music data according to the page-linked music information 20A$a$ or button-linked music information 20A$b$ included in the web page information 20. In such a case, the CPU 5 reads the corresponding music data from the hard disk drive 7. At this point, the CPU 5 sends the music data retrieved from the hard disk drive 7 to the data storing and reproducing apparatus 2 in streaming mode through the network interface 10 under UDP/IP (User Datagram Protocol/Internet Protocol). In this manner, the CPU 5 allows the user at the data storing and reproducing apparatus 2 to reproduce and listen to the music data.

(2) Structure of the Data Storing and Reproducing Apparatus

Figure 5:
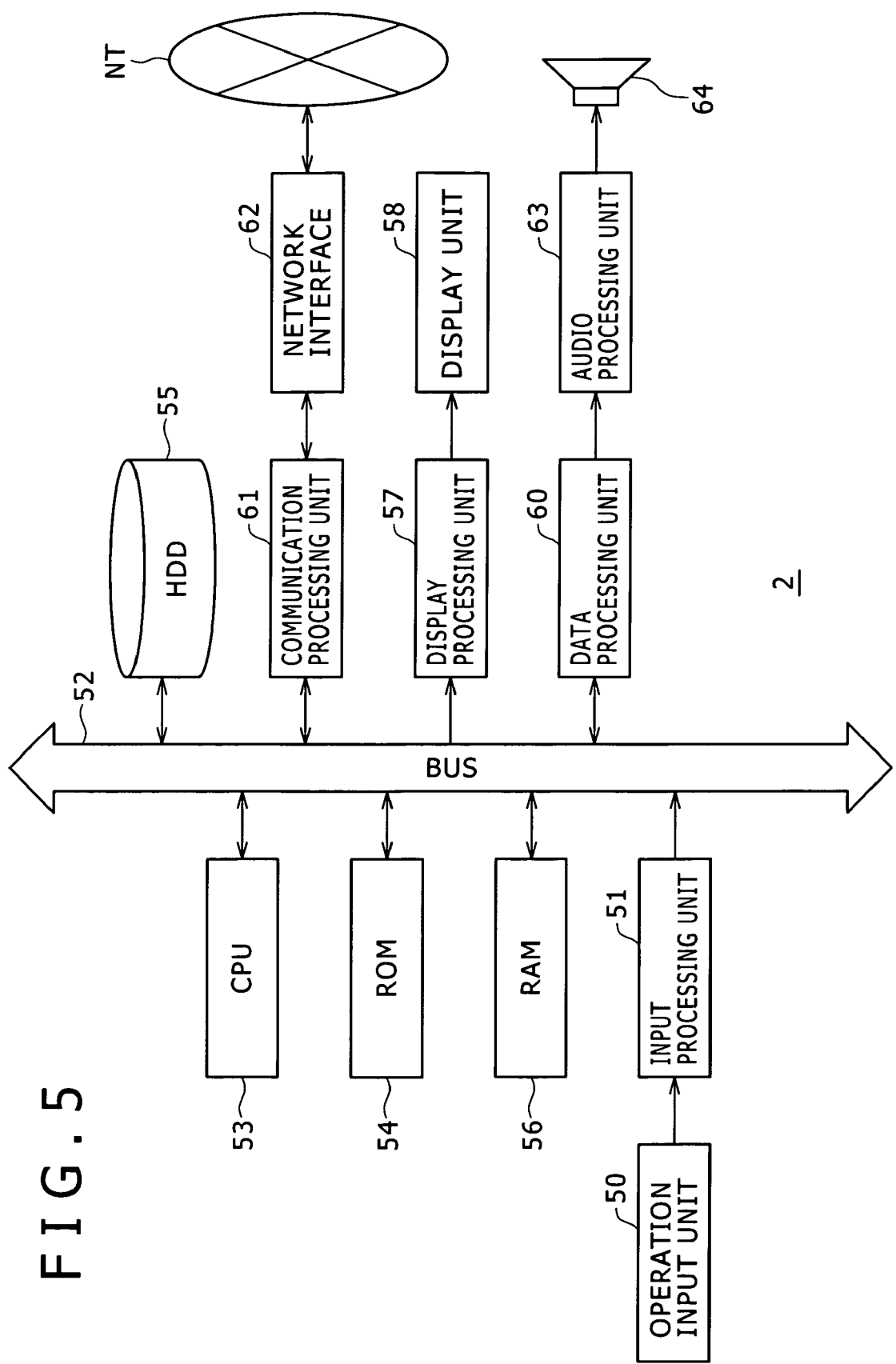
FIG. 5 is a block diagram showing a circuit structure of a data storing and reproducing apparatus.

Described below with reference to FIG. 5 is a hardware circuit structure of hardware circuit blocks making up the data storing and reproducing apparatus 2. The user may operate an operation input unit 50 constituted by various operation buttons formed on the surface of the apparatus enclosure or on a remote controller (not shown). In such a case, the user's operation is translated into an operation input signal that is sent to an input processing unit 51. The input processing unit 51 subjects the operation input signal coming from the operation input unit 50 to predetermined processing for conversion into an operation command. The command derived from the conversion is output to a CPU 53 over a bus 52.

The CPU 53 reads such programs as the basic program, reproduction program, and web browser from a hard disk drive 55 or ROM 54, and loads the retrieved programs via the bus 52 into a RAM 56 that serves as a work area for the CPU 53. In keeping with the programs read into the RAM 56, the CPU 53 controls the apparatus 2 as a whole and carries out arithmetic processing as well as processes based on the operation commands supplied from the input processing unit 51.

The CPU 53 outputs the results of the arithmetic operations it performed and of the processes it carried out in response to the received operation commands, to a display processing unit 57 as page screen data. The display processing unit 57 performs display-related processes such as digital-to-analog conversion on the page screen data received from the CPU 53 in order to obtain a screen signal, and sends the screen signal thus acquired to a display unit 58. The display processing unit 57 causes the display unit 58 to display the page screen based on the received screen signal so that the user may view what is displayed.

The user may operate the operation unit 50 to input an operation input signal requesting acquisition of the web page information 20 to the CPU 53. In turn, the CPU 53 sends a page information request signal to the music data distribution server SV1 by way of a communication processing unit 61 and a network interface 62, in that order. In response to the request, the CPU 53 receives the highest-layer web page information 20 from the music data distribution server SV1 via the network interface 62 and communication processing unit 61, in that order.

The CPU 53 checks to determine whether or not page-linked music information (20A$a$ through 22D$a$) is included in the web page information 20. On detecting the page-linked music information from the web page information 20, the CPU 53 sends a music data request signal to the music data distribution server SV1 according to the detected information.

As a result, the CPU 53 receives music data in streaming mode from the music data distribution server SV1 through the network interface 62 and communication processing unit 61, in that order. At the same time, the CPU 53 causes a data processing unit 60 to subject the received music data to reproduction-related processes (e.g., decoding of the music data received in streaming mode), prompts an audio processing unit 63 to perform audio processing on the processed music data (e.g., D/A conversion of the decoded digital data into analog data), and outputs the resulting audio signal to speakers 64. The CPU 53 then causes the speakers 64 to output music based on the audio signal for the user's enjoyment.

On the basis of the web page information 20, the CPU 53 further generates page screen data and forwards the generated data to the display unit 58 through the display processing unit 57, whereby the page screen is displayed on the display unit 58.

In the manner described above, the CPU 53 allows the display unit 58 to display the page screen while simultaneously reproducing the music data corresponding to the displayed page screen for the user to take in.

On the page screen displayed on the display unit 58, the CPU 53 further displays selection buttons based on the button information found in the web page information 20. When the user points (i.e., focuses) a cursor onto a given selection button derived from the button information, the CPU 53 allows the user to listen to the music data corresponding to the selection button in accordance with the button-linked music information linked to the applicable button information. At the same time, based on the specific button information linked to the button information, the CPU 53 displays the selection button in question as the specifically selected button in a manner different from the normal button display so that the user may visually recognize the button being focused.

(3) Process of Changing the Reproduced Music Data

What follows is a description of how the data storing and reproducing apparatus 2 changes the reproduced music data in response to the user's operations. If the music data corresponding to the newly selected item turns out to be the same as the music data associated with the currently selected item, the inventive data storing and reproducing apparatus 2 reproduces continuously the currently reproduced music data.

(3-1) Changing the Reproduced Music Data Upon Screen Transition

Described below is how the data storing and reproducing apparatus 2 may change the reproduced music data upon transition from one screen to another displayed on the display unit 58 in accordance with items in the web page information 20.

Figure 6:
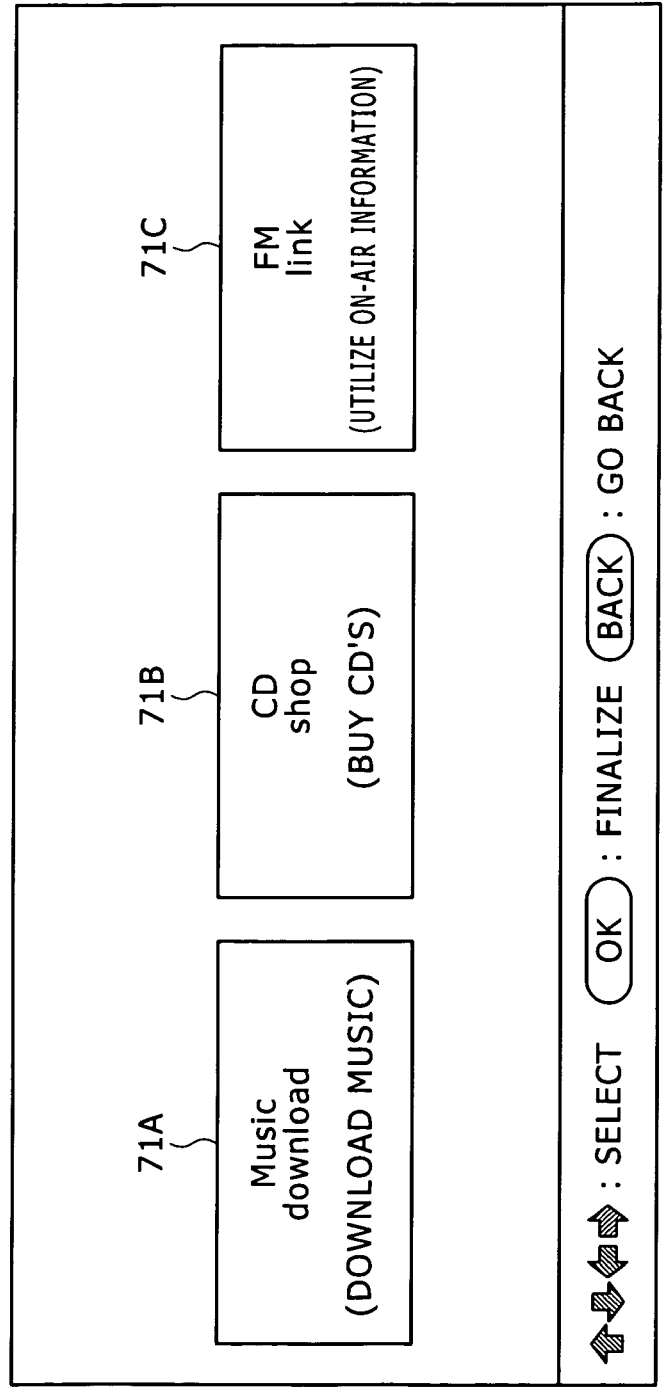
FIG. 6 is a schematic view showing a structure of a main page screen.

As shown in FIG. 6, the data storing and reproducing apparatus 2 may illustratively generate page screen data based on the main page information 20A acquired from the music data distribution server SV1 and thereby display a main page screen 70 on the display 58. At the same time, the data storing and reproducing apparatus 2 may reproduce music data "abcd.mp3" linked to the main page information 20A.

The main page screen 70 includes three selection buttons: a download page button 71A for causing the music data distribution server SV1 to display the download top page information 21A; a CD shop page button 71B for getting CD shop top page information 21B displayed; and an FM (frequency modulation) link page button 71C for having FM link top page information 21C displayed. Given an operation input signal reflecting the user's operation on any one of the buttons, the CPU 53 of the data storing and reproducing apparatus 2 acquires the web page information 20 corresponding to the operated selection button from the music data distribution server SV1.

At the bottom of the main page screen 70 appears an operation button notice area 74. The operation button notice area 74 displays button marks designed to notify the user of the usable (i.e., effective) operation buttons out of those on the remote controller (i.e., operation input unit 50) for making command entries through the main page screen 70. Each of the page screens shown to appear on the display unit 58 in the ensuing description includes the same operation button notice area as that shown on the main page screen 70, so that this notice area will not be described further.

If the user clicks on the download page button 71A, an operation input signal is input through the operation input unit 50 requesting acquisition of the main page information 20A. Given the input signal, the CPU 53 sends a page information request signal to the music data distribution server SV1 and receives the download top page information 21A (FIG. 4) in return.

The CPU 53 checks to determine whether or not the download top page information 21A contains any page-linked music information 21A*a*.

If the page-linked music information 21A*a* is not found included in the download top page information 21A, the CPU 53 stops reproducing the music data "abcd.mp3" linked to the main page screen 70. The letters "abcd" signify the music title "ABCD" attached to the music data "abcd.mp3."

In such a case, the CPU 53 will not continuously reproduce the same music data following transition to the new page screen. In the usual setup, the currently reproduced music data was left being reproduced even after transition to a page screen which differed from the preceding screen in perception and which had no music data linked thereto. A sense of awkwardness usually experienced on such an occasion is no longer perceived by the user viewing the newly selected page with the inventive apparatus.

If the page-linked music information 21A*a* is found included in the download top page information 21A, the CPU 53 compares the file name of music data in the page-linked music information 21A*a* after the transition, with the file name of music data in the page-linked music information 20A*a* linked to the main page screen 70 before the transition. In making the comparison, the CPU 53 determines whether there is a match between the two file names, i.e., between the music data represented thereby.

A mismatch between the two file names of the music data signifies that the music data to be reproduced following the screen transition is different from the currently reproduced music data. In this case, the CPU 53 stops reproducing the music data "abcd.mp3" linked to the main page screen 70, acquires from the data storing and reproducing apparatus 2 the music data represented by the page-linked music information 21A*a*, and starts reproducing the newly acquired music data.

A match between the two file names of the music data signifies that the music data to be reproduced following the screen transition (called the post-transition music data) is the same as the currently reproduced music data (called the pre-transition music data). That is, the two file names are the same "abcd.mp3" each. In such a case, the CPU 53 continuously reproduces the current music data "abcd.mp3."

In the manner described, if the same music data "abcd.mp3" is found linked both to the main page information 20A before the transition and to the download top page information 21A after the transition, the CPU 53 can continuously reproduce the music data "abcd.mp3" without interruption and not from the beginning of the music once the new screen is displayed. The user can thus listen to the music "ABCD" continuously without getting an awkward feeling of discontinuity upon screen transition.

Based on the download top page information 21A, the CPU 53 generates page screen data and sends the generated data to the display unit 58 via the display processing unit 57. The CPU 53 thus causes the display unit 58 to display a download top page screen 75 as shown in FIG. 7A.

As described above, the data storing and reproducing apparatus 2 detects page-linked music information from the web page information 20 following screen transition, and checks to determine whether or not the post-transition music data represented by the page-linked music information matches with the pre-transition music data. In the case of a match between the post-transition and the pre-transition music data, the data storing and reproducing apparatus 2 reproduces continuously the currently reproduced pre-transition music data. Unlike in the usual setup where the pre-transition music data is again reproduced from the beginning after the transition, the user will not feel awkward because the current music data is reproduced without interruption.

(3-2) Changing the Reproduced Music Data Upon Transition from One Focused Position to Another What follows is a description of how the data storing and reproducing apparatus 2 may change the reproduced music data upon transition from one focused position to another (i.e., positions pointed to by a cursor 77 designating the operation to be performed on the display unit 58). As in the case of screen transition, if there is a match between the music data linked to the focused position before the transition (called the pre-transition music data) and the music data linked to the focused position after the transition (called the post-transition music data), the data storing and reproducing apparatus 2 is arranged to reproduce continuously the currently reproduced pre-transition music data.

Figures 7A, 7B:
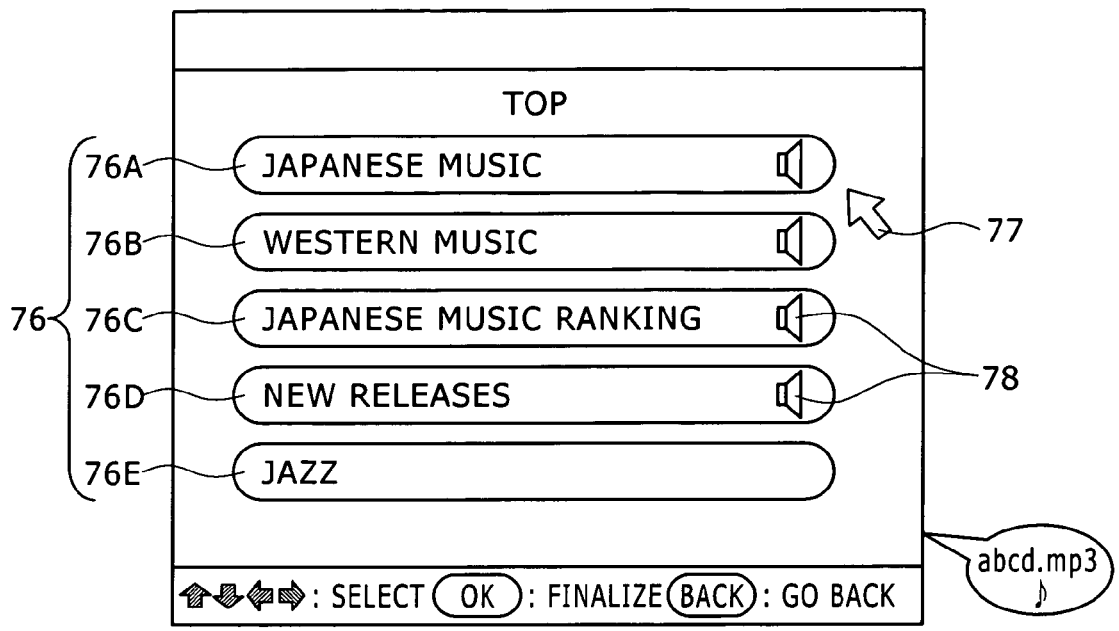
FIGS. 7A and 7B are schematic views explanatory of a download top page screen.

At this point, as shown in FIG. 7A, the data storing and reproducing apparatus 2 displays on the display unit 58 the download top page screen 75 based on the download top page information 21A while reproducing the music data "abcd.mp3" linked to the download top page screen 75. The CPU 53 displays genre selection buttons 76 as the usable selection buttons on the download top page screen 75 on the basis of the button information included as items in the download top page information 21A.

The download top page screen 75 includes the following genre selection buttons 76: a Japanese music selection button 76A for displaying Japanese music top page information 22A (FIG. 4) in response to the user's operation; a Western music selection button 76B for displaying Western music top page information 22B (FIG. 4); a Japanese music ranking selection button 76C for displaying Japanese music ranking top page information 22C (FIG. 4); a new release selection button 76D for displaying new release top page information 22D (FIG. 4); and a Jazz selection button 76E for displaying jazz top page information 22E (FIG. 4). The user's operations may shift the focused position onto any one of the genre selection buttons 76. The resulting operation input signal is forwarded to the CPU 53. In turn, the CPU 53 acquires from the music data distribution server SV1 the web page information 20 linked to the user-operated genre selection button 76.

As shown in FIG. 7B, the button-linked music information 21A*b* is included as the items of button-linked music information 21A*ba* through 21A*bd* in the button information linked to each of the genre selection buttons 76. It should be noted that no button-linked music information is included in the button information linked to the jazz selection button 76E.

Suppose that the focused position is on any one of the genre selection buttons 76 having the corresponding button-linked music information 21A*b*, i.e., that one of the genre selection button 76 is being focused. In that case, the CPU 53 acquires from the music data distribution server SV1 the music data linked to the corresponding button-linked music information 21A*b* and thereby reproduces relevant music data. On the other hand, if the jazz selection button 76E deprived of button-linked music information is focused, the CPU 53 will not reproduce any music data. Whenever the focused position is on any other genre selection button 76, the CPU 53 reproduces the music data "abcd.mp3" linked to the download top page screen 75.

On the download top page screen 75, each of the genre selection buttons 76 linked to the corresponding music data is provided with a speaker mark 78 on the right-hand edge of the button. The speaker mark 78 is intended to let the user visually recognize that music data will be reproduced in connection with the genre selection button 76 being focused. In other words, the speaker mark 78 causes the user intuitively to recognize that focusing on the jazz selection button 76 deprived of the mark will not prompt the CPU 53 to reproduce any music data.

In FIG. 7A, the focused position of the download top page screen 75 is in the top right corner of the screen 75. That is, the cursor 77 is not focused on any of the genre selection buttons 76 discussed above. In this case, the CPU 53 reproduces the music data "abcd.mp3" denoted by the page-linked music information 21A*a* linked to the download top page screen 75.

If the user shifts the focused position onto one of the genre selection buttons 76 as shown in FIG. 8A, the CPU 53 receives an operation input signal via the operation input unit 50 requesting reproduction of music data. The input signal causes the CPU 53 to determine whether or not any button-linked music information 21A*b* is included in the button information linked to the genre selection button 76 being operated on.

If the button-linked music information 21A*b* is not found included in the button information corresponding to the genre selection button 76 in question, the CPU 53 stops reproducing the music data "abcd.mp3" linked to the download top page screen 75.

In the manner described, the CPU 53 stops reproducing the music data while the genre selection button 76 free of any corresponding music data is being focused. Because the CPU 53 will not reproduce music of a genre different from the currently focused genre, the user will not experience a sense of awkwardness when effecting transition to, and making use of, the download top page screen 75.

On the other hand, if the button-linked music information 21A*b* is found included in the button information corresponding to the genre selection button 76 of interest, the CPU 53 compares the file name of music data in the button-linked music information 21A*b*, with the file name of music data in the page-linked music information 20A*a* detected from the main page screen 70. In making the comparison, the CPU 53 checks to determine if there is a match between the music data represented by the two music files.

A mismatch between the file names of the music data signifies that the music data linked to the button-linked music information 21A*b* is not the same as the currently reproduced music data "abcd.mp3." In that case, the CPU 53 stops reproducing the music data "abcd.mp3" linked to the main page screen 70, acquires from the music data distribution server SV1 the post-transition music data represented by the button-linked music information 21A*b* in question, and starts reproducing the post-transition music data thus acquired.

A match between the file name of the music data represented by the page-linked music information 20A*a* and the file name of the music data indicated by the button-furnished music information 21A*b* signifies that the currently reproduced pre-transition music data linked to the main page screen 70 matches with the post-transition music data corresponding to the genre selection button 76 in question. That is, the two music files have the same name "abcd.mp3" each. In this case, the CPU 53 reproduces continuously the current music data "abcd.mp3."

As described, if the same music data "abcd.mp3" is found linked both to the main page information 20A before the transition to a newly focused position and to the button information corresponding to the genre selection button 76 after the transition, the CPU 53 may reproduce the music data "abcd.mp3" continuously and not from the beginning of the data once the button is focused. The user can thus listen to the music "ABCD" continuously without getting an awkward feeling of discontinuity upon screen transition.

The CPU 53 carries out the above-described process likewise when the focused position is shifted from one genre selection button 76 to another.

Suppose that the focused position is shifted from the Japanese music selection button 76A to the Western music selection button 76B as shown in FIG. 8B. In such a case, the CPU 53 detects the button-linked music information 21A*bb* from the button information linked to the Western music selection button 76B. At the same time, the CPU 53 compares the file name of music data in the button-linked music information 21A*bb* linked to the Western music selection button 76B, with the file name of music data in the button-linked music information 21A*ba* linked to the Japanese music selection button 76A.

In the above case, there is a mismatch between the music data "abcd.mp3" corresponding to the button-linked music information 21A*ba* before the transition and the music data "efgh.mp3" (FIG. 7B) associated with the button-linked music information 21A*bb* after the transition. The mismatch prompts the CPU 53 to stop reproducing the music data "abcd.mp3" following the transition, acquire the post-transition music data "efgh.mp3 from the music data distribution server SV1, and reproduce the acquired music data.

Suppose now that as shown in FIG. 8C, the focused position is shifted from the Japanese music selection button 76A to the Japanese music ranking selection button 76C. This results in a match between the music data "abcd.mp3" corresponding to the button-linked music information 21A*ba* before the transition, and the music data "abcd.mp3" (shown in FIG. 7B) associated with the button-linked music information 21A*bc* after the transition. The match prompts the CPU 53 to reproduce continuously the currently reproduced music data "abcd.mp3."

If the focused position is shifted from the Japanese music selection button 76A to the jazz selection button 76E, the CPU 53 stops reproducing the currently reproduced music data "abcd.mp3." That is because no button-linked music information 21A*b* is included in the button information linked to the jazz button 76.

On the basis of the specific button information linked to the button information, the CPU 53 following the transition highlights the genre selection button 76 as the specifically selected button 76*aa* corresponding to the specific button information using a color different from what is usually employed in the normal display (FIGS. 8A, 8B and 8C). The highlighted display allows the user intuitively to recognize that the specifically selected button 76*aa* is being focused.

Upon transition from one focused position to another, as described above, the data storing and reproducing apparatus 2 detects the button-linked music information 21A*b* in the button information after the transition. Simultaneously, the data storing and reproducing apparatus 2 compares the file name of the post-transition music data with the file name of the pre-transition music data. In the case of a match between the file names compared, the data storing and reproducing apparatus 2 continuously reproduces the currently reproduced pre-transition music data without interruption and not from the beginning of the music data once the transition is complete. The user can thus listen to the same music data continuously without getting an awkward feeling of discontinuity upon focused position transition.

(4) Screen Transition Procedure

Described below is the procedure for effecting transition from one page screen to another on the display unit 58 of the data storing and reproducing apparatus 2 according to the invention.

(4-1) Screen Transition Process

Figure 9:
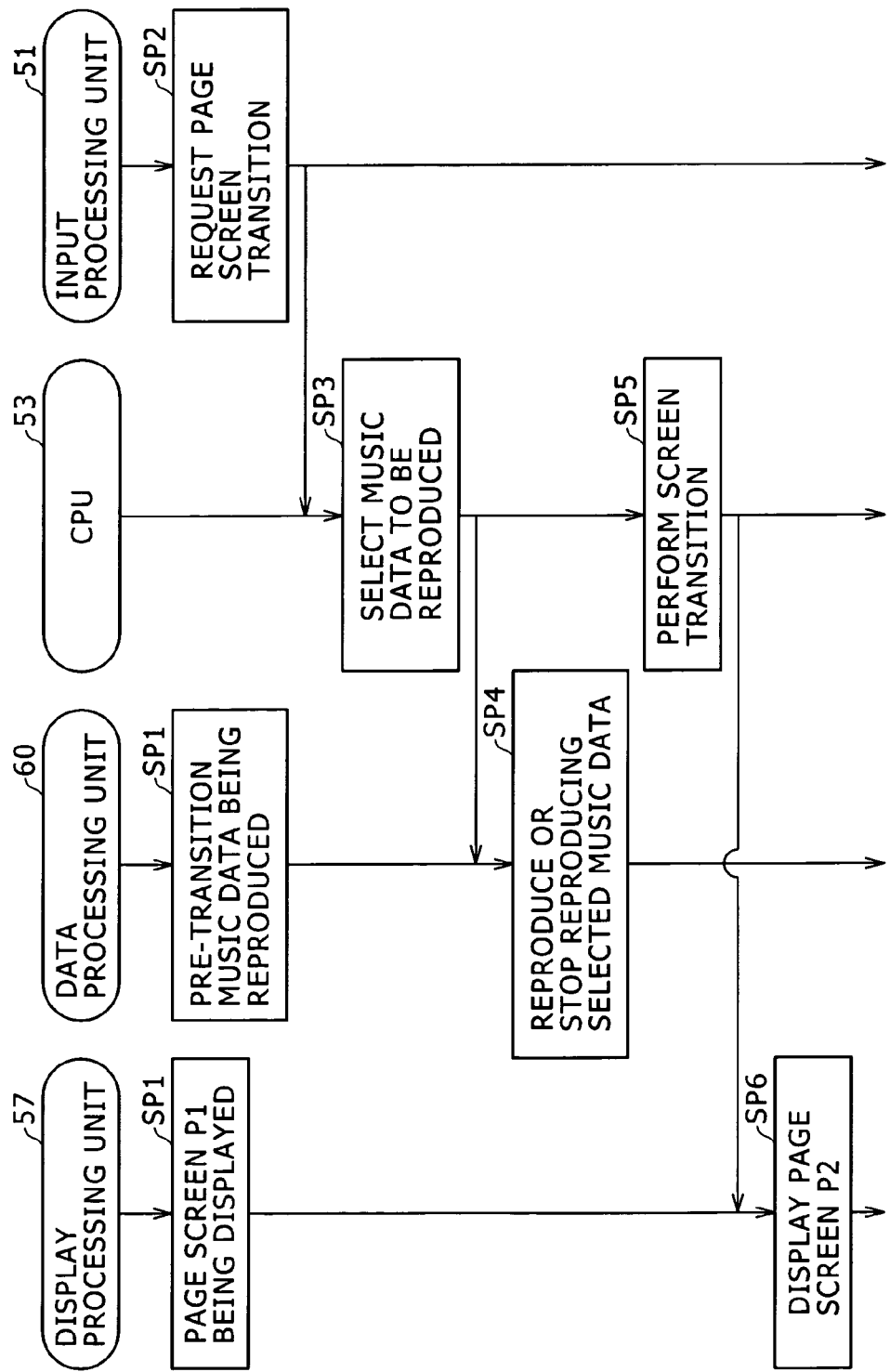
FIG. 9 is a sequence chart in effect upon screen transition.

The process of screen transition takes place as follows: As shown in the sequence chart of FIG. 9, the display processing unit 57 in step SP1 displays a pre-transition page screen P1 on the display unit 58 of the data storing and reproducing apparatus 2. The data processing unit 60 decodes the music data linked to the page screen P1 for music data reproduction in streaming mode. At this point, the audio processing unit 63 converts the music data decoded by the data processing unit 60 into analog format and outputs the converted data to the speakers 64. That is, the music data is being reproduced in step SP1. Illustratively, the main page screen 70 (FIG. 6) is displayed as the page screen P1 and the music data named "abcd.mp3" is reproduced as the music data.

In step SP2, an operation input signal is input by the user operating on the operation input unit 50 to effect page screen transition. Given the input signal, the input processing unit 51 generates an operation command for screen transition and inputs the generated command to the CPU 53.

In step SP3, the CPU 53 selects the music data to be reproduced in accordance with a procedure RT1 for selecting music data upon screen transition, the procedure being part of the web browser program. The procedure RT1 will be discussed later in detail.

The CPU 53 causes the data processing unit 60 to decode the selected music data for music data reproduction and to send the decoded music data to the audio processing unit 63, before reaching step SP4. Illustratively, if selecting the currently reproduced music data "abcd.mp3" as the music data to be reproduced, the CPU 53 causes the data processing unit 60 to continue the current reproduction process (FIG. 7A); if selecting the music data "efgh.mp3," the CPU 53 causes the data processing unit 60 to stop reproducing the currently reproduced music data "abcd.mp3," start reproducing the newly selected music data "efgh.mp3," and output the reproduced music data to the audio processing unit 63. When causing the data process unit 60 to stop reproducing the music data, the CPU 53 inhibits the data processing unit 60 from sending any music data to the audio processing unit 63.

In step SP4, in keeping with the instructions given by the CPU 53 in step SP3, the audio processing unit 63 performs audio processing on the music data fed from the data processing unit 60 and sends the processed data to the speakers 64. In this manner, the audio processing unit 63 allows the user to listen to the music output by the speakers 64. For example, if the music data "abcd.mp3" is supplied, the audio processing unit 63 lets the user take in the music "ABCD." If in step SP3 the CPU 53 causes the data processing unit 60 to stop supplying the music data to the audio processing unit 63, then the audio processing unit 63 does not perform audio processing.

In step SP5, the CPU 53 sends to the display processing unit 57 the page screen data corresponding to the operation command entered in step SP2. Illustratively, the CPU 53 generates the page screen data based on the download top page information 21A (FIG. 4) and outputs the generated data to the display processing unit 57.

In step SP6, the display processing unit 57 performs display processing on the page screen data supplied in step SP5 and forwards the processed data to the display unit 58. As a result, the display unit 58 displays a page screen P2. Illustratively, if the page screen data based on the download top page information 21A is supplied, the display processing unit 57 displays the download top page screen 75 as the page screen P2 following the transition.

(4-2) Selecting the Reproduced Music Data Upon Screen Transition

Figure 10:
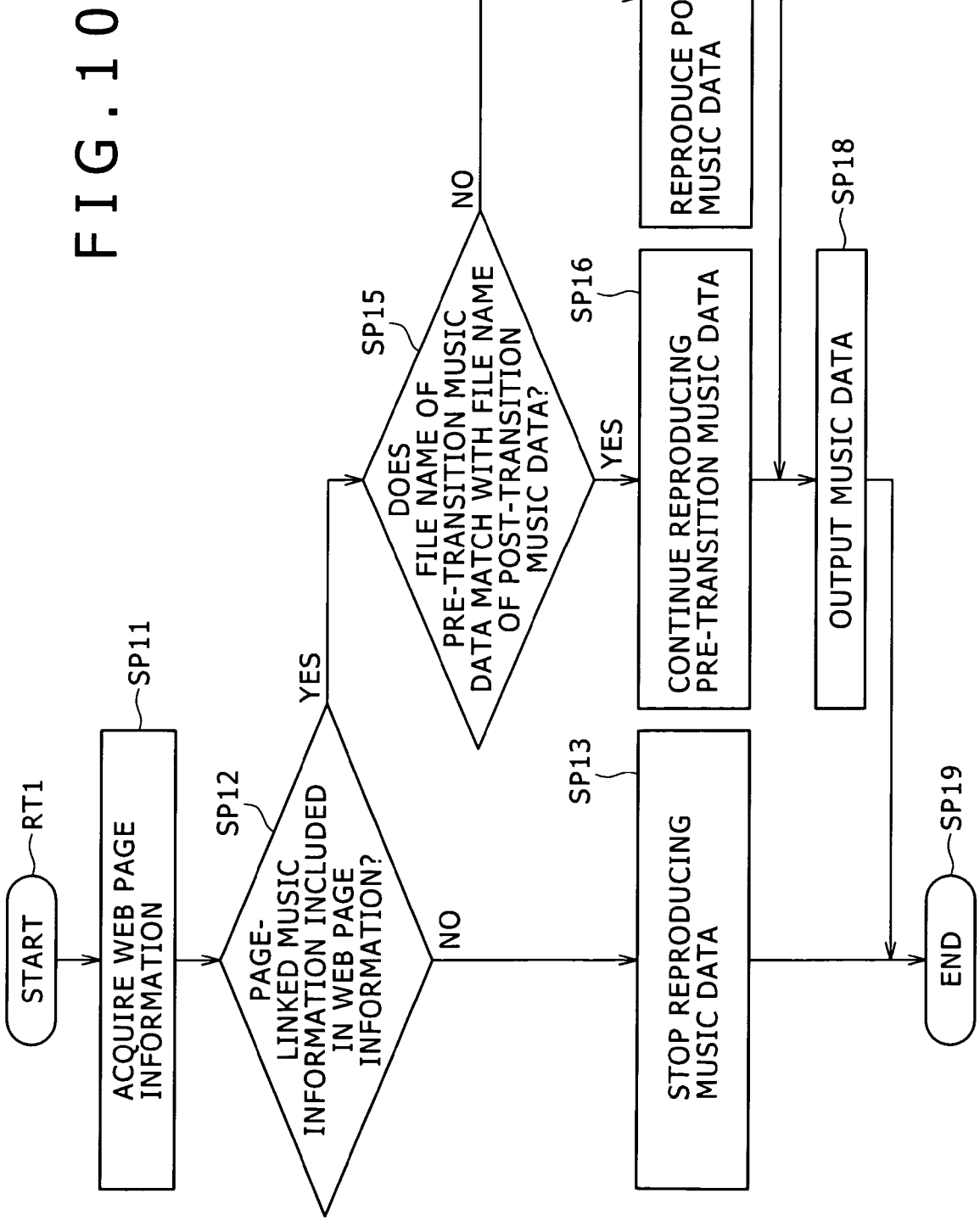
FIG. 10 is a flowchart of steps constituting the procedure for selecting music data to be reproduced upon screen transition.

What follows is an explanation of the procedure for selecting the reproduced music data in step SP3 of the above-described screen transition processing. Described below in detail is the procedure RT1, shown in FIG. 10, for selecting music data upon screen transition.

When an operation command is input from the input processing unit 51, the CPU 53 of the data storing and reproducing apparatus 2 is started up and goes to step sp11.

In step SP11, the CPU 53 acquires from the music data distribution server SV1 the web page information 20 corresponding to the operation command. The CPU 53 then goes to step SP12.

In step SP12, the CPU 53 checks to determine whether or not any page-linked music information is included in the web page information 20 acquired in step SP11.

If in step SP12 the page-linked music information is not found included in the web page information 20, that means there is no music data to be reproduced on the page screen after the transition. In that case, the CPU 53 goes to step SP13 and causes the data processing unit 60 to stop reproducing the currently reproduced music data. As a result, no music data is supplied to the audio processing unit 63 and thus music reproduction by the data storing and reproducing apparatus 2 is brought to an end.

If in step SP12 the page-linked music information is found included in the acquired page screen data, that means there is post-transition music data to be reproduced on the page screen following the transition. In this case, the CPU 53 goes to step SP15.

In step SP15, the CPU 53 compares the file name of the pre-transition music data with the file name of the post-transition music data. In making the comparison, the CPU 53 checks to determine if there is a match between the two file names.

If in step SP15 a match is found between the file name of the pre-transition music data and the file name of the post-transition music data, that means the post-transition music data to be reproduced next is the same as the currently reproduced music data. In this case, the CPU 53 goes to step SP16.

In step SP16, the CPU 53 establishes the currently reproduced music data as the music data to be reproduced next in order to ensure that the ongoing reproduction of the music data will continue uninterrupted. Step SP16 is followed by step SP18.

If in step SP15 a mismatch is detected between the file name of the pre-transition music data and the file name of the post-transition music data, that means the music data to be reproduced on the screen following the transition is different from the currently reproduced music data. In this case, the CPU 53 goes to step SP17.

In step SP17, the CPU 53 causes the data processing unit 60 to stop reproducing the currently reproduced music data, acquire the post-transition music data from the music data distribution server SV1 in keeping with the page-linked music information, and establish the post-transition music data as the music data to be reproduced next in order to start music data reproduction. The CPU 53 then goes to step SP18.

In step SP18, the CPU 53 causes the data processing unit 60 to forward to the audio processing unit 63 the music data established in step SP17 as the data to be reproduced next. Thereafter, the CPU 53 goes to step SP19 and terminates the procedure RT1 for music data selection upon screen transition.

(5) Procedure for Focused Position Transition

What follows is a description of the procedure for transition to the focused position pointed to by the cursor on the display unit 58 of the data storing and reproducing apparatus 2.

(5-1) Process of Transition to the Focused Position

Figure 11:
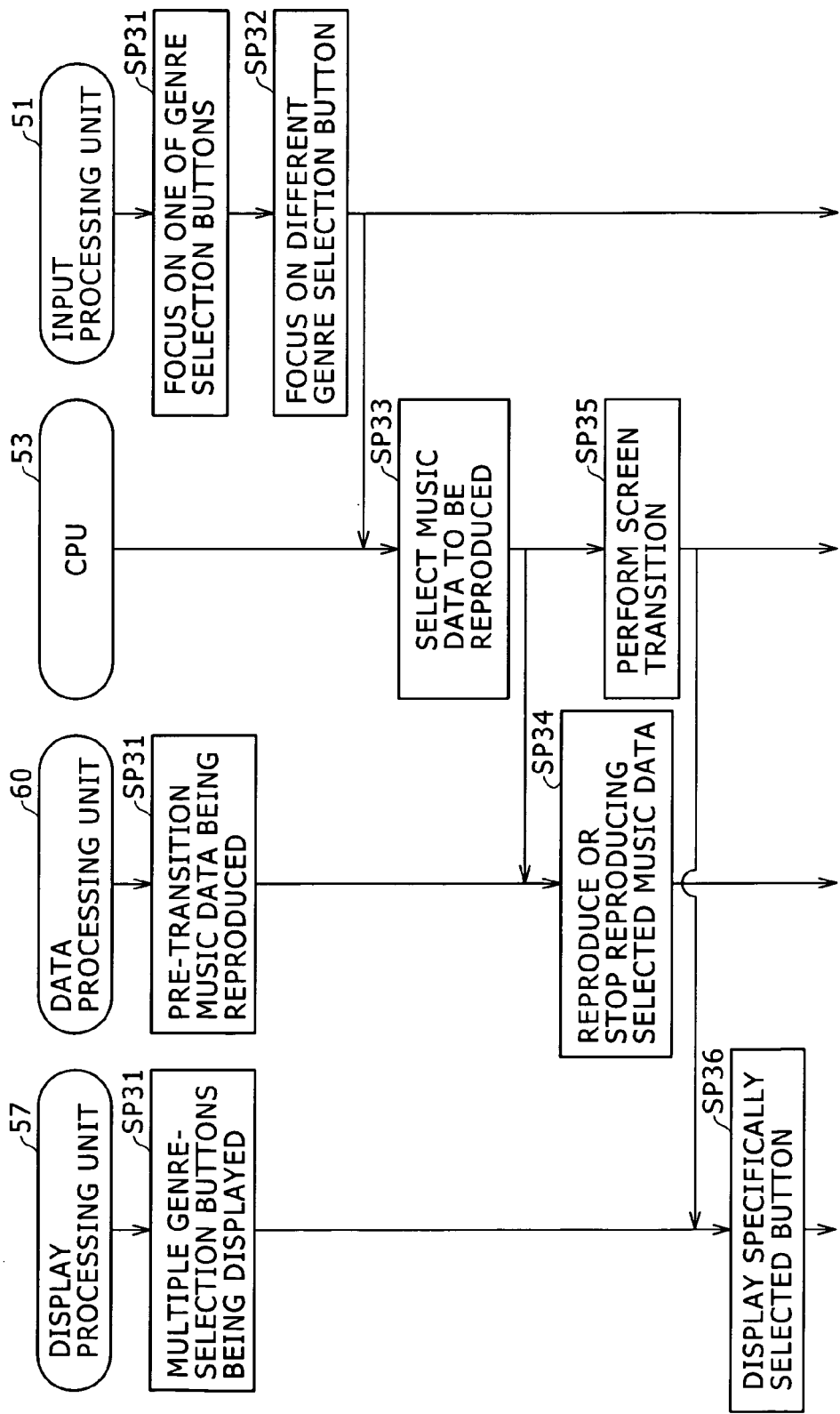
FIG. 11 is a sequence chart in effect upon transition from one focused position to another.
Figure 12:
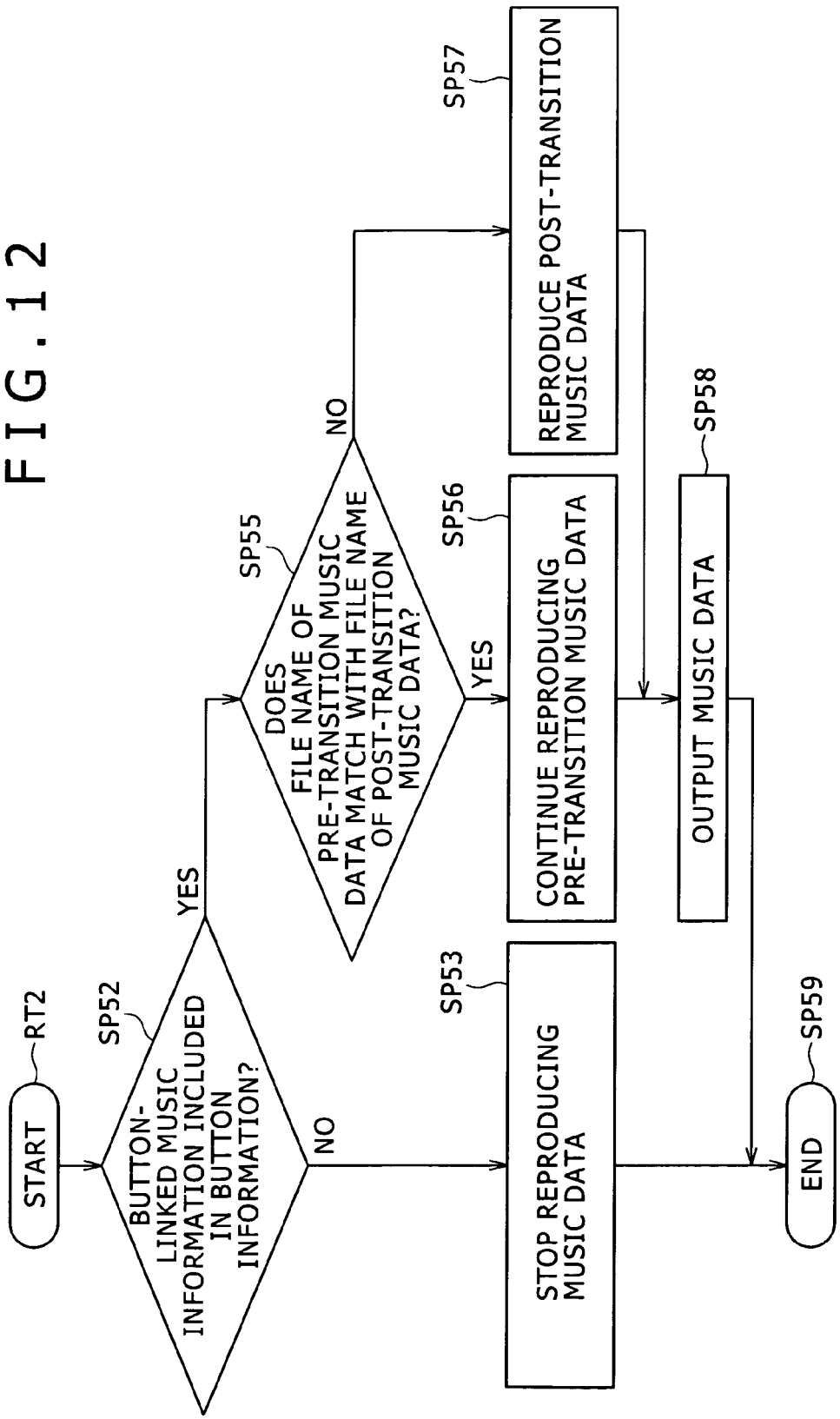
FIG. 12 is a flowchart of steps constituting the procedure for selecting music data to be reproduced upon transition from one focused position to another.

In step SP31 of the sequence chart in FIG. 11, the display processing unit 57 of the data storing and reproducing apparatus 2 displays on the display unit 58 a page screen including a plurality of genre selection buttons 76. With the cursor 77 pointing to one of the genre selection buttons 76, the input processing unit 51 focuses on the cursor-designated genre selection button 76. Meanwhile, the data processing unit 60 decodes the pre-transition music data linked to the focused genre selection button 76 for reproduction of the pre-transition music data in streaming mode. At this point, the audio processing unit 63 converts the pre-transition music data decoded by the data processing unit 60 into analog format and outputs the converted data to the speakers 64. That is, the pre-transition music data is being reproduced in step SP31. Illustratively, the download top page screen 75 (FIG. 8A) is displayed with the Japanese music selection button 76A focused, and the music data named "abcd.mp3" is reproduced as the pre-transition music data.

In step SP32, the focused position is shifted to a different genre selection button 76 in response to the user's operation, so that a corresponding operation input signal is input to the input processing unit 51 through the operation input unit 50. In turn, the input processing unit 51 generates an operation command for changing the focused position (specifically selected button 76*aa*) from one genre selection button to another (FIGS. 8A, 8B and 8C), and inputs the generated command to the CPU 53.

In step S33, the CPU 53 selects the music data to be reproduced in accordance with a procedure RT2 for music data selection upon focused position transition. The procedure RT2 will be discussed later in detail.

The CPU 53 causes the data processing unit 60 to decode the selected music data for music data reproduction and to send the decoded data to the audio processing unit 63. The CPU 53 then goes to step SP34. Illustratively, if the currently reproduced music data "abcd.mp3" is selected as the post-transition music data, the CPU 53 causes the data processing unit 60 to continue the ongoing music data reproduction (FIG. 8C). If the music data "efgh.mp3" is selected as the post-transition music data, the CPU 53 causes the data processing unit 60 to stop reproducing the music data "abcd.mp3," start reproducing the music data "efgh.mp3" (FIG. 8B), and forward the reproduced music data to the audio processing unit 63. If the CPU 53 causes the data processing unit 60 to stop reproducing the music data, the data processing unit 60 stops sending any music data to the audio processing unit 63. The CPU 53 then goes to step SP35.

Given the instructions from the CPU 53 in step SP33, the audio processing unit 63 in step SP34 performs audio processing on the music data fed from the data processing unit 60 and sends the processed data to the speakers 64. In this manner, the audio processing unit 63 allows the user to listen to the music output by the speakers 64. Illustratively, if the music data "abcd.mp3" is supplied, the audio processing unit 63 lets the user take in the music "ABCD." If in step SP33 the CPU 53 causes the data processing unit 60 to stop supplying the music data to the audio processing unit 63, then the audio processing unit 63 does not perform audio processing.

In step SP35, the CPU 53 carries out screen changing processes for generating the page screen data constituting the specifically selected button 76*aa* based on the specific button information. The page screen data thus generated is forwarded to the display processing unit 57.

In step SP36, the display processing unit 57 displays the page screen supplied from the CPU 53. As a result, the display unit 58 displays the page screen on which the focused position has been shifted.

(5-2) Selecting the Reproduced Music Data Upon Transition to the Focused Position What follows is an explanation of the procedure for selecting the music data in step SP33 of the above-described screen transition processing. Described below in detail is the procedure RT2, shown in FIG. 11, for music data selection upon focused position transition.

When an operation command for changing the specifically selected button 76*aa* (FIG. 8A) is input from the input processing unit 51, the CPU 53 of the data storing and reproducing apparatus 2 is started up and goes to step SP52.

In step SP52, the CPU 53 checks to determine whether or not any button-linked music information is included in the screen structure information corresponding to the genre selection button 76 selected as the specifically selected button 76*aa* following the transition.

If the button-linked music information is not found included in the genre selection button 76 focused after the transition, that means there is no music data corresponding to the genre selection button 76 in question. In this case, the CPU 53 goes to step sP53 and causes the data processing unit 60 to stop reproducing the currently reproduced music data. As a result, no music data is supplied to the audio processing unit 63 and the music data reproduction by the data storing and reproducing apparatus 2 is brought to an end.

If in step S52 the page-linked music information is found included in the button information corresponding to the genre selection button 76 being focused following the transition, that means there is the music data to be reproduced when the genre selection button 76 in question is focused. In this case, the CPU 53 goes to step SP55.

In step SP55, the CPU 53 compares the button-linked music information before the transition with the button-linked music information after the transition, to see if there is a match between the file name of the pre-transition music data and the file name of the post-transition music data.

If a match is found between the file name of the pre-transition music data and the file name of the post-transition music data, that means the currently reproduced pre-transition music data matches with the post-transition music data to be reproduced next. The CPU 53 then goes to step SP56.

In step SP56, the CPU 53 establishes the currently reproduced pre-transition music data as the music data to be reproduced next in order to continue the ongoing reproduction of the pre-transition music data. The CPU 53 then goes to step SP58.

If in step SP55 a mismatch is found between the file name of the pre-transition music data and the file name of the post-transition music data, that means the currently reproduced pre-transition music data differs from the post-transition music data to be reproduced next. In that case, the CPU 53 goes to step SP57.

In step SP57, the CPU 53 causes the data processing unit 60 to stop reproducing the currently reproduced pre-transition music data, acquire from the music data distribution server SV1 the post-transition music data in accordance with the page-linked music information corresponding to the genre selection button 76 following the transition, and establish the post-transition music data as the music data to be reproduced so that reproduction of the post-transition music data will be started. The CPU 53 then goes to step SP58.

In step SP58, the CPU 53 causes the data processing unit 60 to send to the audio processing unit 63 the reproduction-destined music data established in step SP56 or SP57. The CPU 53 then reaches step SP59 and terminates the procedure RT2 for music data selection upon focused position transition.

(6) Operations and Effects

Where the data storing and reproducing apparatus 2 structured as described above is reproducing the pre-transition music data linked as content data to the web page information 20 that is the currently selected item, the user may perform operations to request transition from one page screen to another on the display unit 58, i.e., to select web page information 20 different from the current web page information 20. In that case, the data storing and reproducing apparatus 2 checks to determine whether or not there is any page-linked music information about the post-transition music data linked to the different web page information 20. If the post-transition music data is detected, the apparatus 2 compares the file name of the pre-transition music data with the file name of the post-transition music data. If the comparison results in a match between the two file names, the apparatus 2 continuously reproduces the currently reproduced pre-transition music data.

That is, if the music data linked to the post-transition page screen turns out to be the same as the music data linked to the pre-transition music data, the inventive data storing and reproducing apparatus 2 allows the user to continue listening to the pre-transition music data following the transition without being disturbed by the music data getting interrupted halfway and repeated from the beginning. The user can take in the pre-transition music data without experiencing a sense of disruption about the reproduction.

In another situation, the data storing and reproducing apparatus 2 may reproduce the pre-transition music data linked as content data to the button information that is the currently selected item, and the user may perform operations to focus on a different selection button requesting transition from the current button information to different button information. In that case, the data storing and reproducing apparatus 2 checks to determine whether or not there is the button-linked music information 21A*b* about the post-transition music data linked to the different button information. If the post-transition music data is detected, the apparatus 2 compares the file name of the pre-transition music data with the file name of the post-transition music data. If the comparison results in a match between the two file names, the apparatus 2 continuously reproduces the currently reproduced pre-transition music data.

That is, when the specifically selected button 76*aa* is shifted from the currently focused genre selection button 76 to a different genre selection button 76, the data storing and reproducing apparatus 2 still allows the user to continue listening to the pre-transition music data. The user can smoothly take in the music data corresponding to the specifically selected button 76*aa* as if there had been no transition.

It might happen that the data storing and reproducing apparatus 2 searches for but fails to find the page-linked music information about the post-transition music data linked to the different web page information 20. In such a case, the apparatus 2 stops reproducing all music data.

In the manner described, the data storing and reproducing apparatus 2 reproduces only the music data linked to the web page information 20. Any music data not associated with the page screen based on the web page information 20 is prevented from getting reproduced. This makes it possible to let the user experience solely the intended impression of each page screen.

As described above, in response to the request made by the user through the operation input unit 50 to effect transition to a desired page screen during reproduction of the pre-transition music data, the inventive data storing and reproducing apparatus 2 checks to determine whether or not there is page-linked music information linked to the web page information corresponding to the requested page screen. If the page-linked music information is detected, the apparatus 2 compares the file name of the pre-transition music data with the file name of the post-transition music data. If the comparison results in a match between the two file names, the transition apparatus 2 lets the user keep on listening to the pre-music data without being disturbed by the music getting stopped halfway and repeated from the beginning.

(7) Other Embodiments

In the foregoing description where one of the selection buttons displayed on the page screen is focused for requesting transition to another page screen, the data storing and reproducing apparatus 2 described above as the preferred embodiment of the invention was shown to select the button information linked to the selection button being focused. However, this is not limitative of the present invention. Alternatively, the selection buttons may carry the names of content data such as song titles. In this case, focusing on one of the selection buttons initiates request for reproduction or downloading of the selected content data. As another alternative, the selection button information provided as items may be replaced by screen structure information other than the button information such as photo image information or illustration image information linked to music data.

In the foregoing description, the data storing and reproducing apparatus 2 according to the invention was shown to acquire the music data linked to the web page information 20 from the music data distribution server SV1 over the network NT. Alternatively, the data storing and reproducing apparatus 2 may be arranged to reproduce music data retrieved from the HDD 55 or ROM 54, from a locally connected external storage medium, or from various removable medium including CDs and DVDs.

In the foregoing description, the data storing and reproducing apparatus 2 was shown to compare the page-linked music information in the web page information 20 before transition with the page-linked music information in the web page information 20 after transition, to check for a match between the pre-transition music data and the post-transition music data. Alternatively, a match or a mismatch between the pre-transition music data and the post-transition music data may be determined by comparing diverse kinds of information.

Illustratively, the hard disk drive 7 of the music data distribution server SV1 stores not only music data but also attribute information about the music data to which the information corresponds and which is made downloadable. The data storing and reproducing apparatus 2 may check for a match between items of the attribution information with a view to determining whether there is a match between the pre-transition music data and the post-transition music data. The attribution information used for that purpose may include: song title information constituting the titles of the songs based on the corresponding music data, playing time information indicative of the reproduction times of the songs in the music data, artist information showing the names of the artists associated with the songs, and genre information representative of the genres to which the songs belong. The attribute information may be included in the web page information 20.

Another information by which to determine a match or a mismatch between the pre-transition music data and the post-transition music data is paths that denote URLs or locations on an internal storage medium where music data is stored. When comparing the pre-transition music data with the post-transition music data, the data storing and reproducing apparatus 2 may compare suitable parts other than the file names on the paths involved. If there is a match between these parts, the apparatus 2 recognizes a match between the pre-transition music data and the post-transition music data.

In the above setup, if a plurality of items of music data having different file names are found to exist in a folder representing a single song, the inventive data storing and reproducing apparatus 2 considers these items of music data to be the same song and proceeds with the ongoing music reproduction. That is, it might happen that transition is effected from one page screen linked to a song to another page screen linked to different music data which in fact represents the same song. In that case, the data storing and reproducing apparatus 2 may reproduce continuously the pre-transition music data to ensure uninterrupted music data reproduction for the user.

In the foregoing description, the data storing and reproducing apparatus 2 was also shown to reproduce music data as the content data. Alternatively, the inventive apparatus may reproduce diverse kinds of data such as video data.

In addition, the data storing and reproducing apparatus 2 in the foregoing description was shown to determine the presence or absence of the music data linked to the web page information 20 by searching for corresponding page-linked music information. Alternatively, if content data is included in the web page information 20 itself, the apparatus 2 may check for the presence or absence of the corresponding content data in that information.

Furthermore, the data storing and reproducing apparatus 2 in the foregoing description was shown to acquire reproduction-destined music data from the music data distribution server SV1 in streaming mode so as to start reproducing the music data regardless of the line speed in effect. Alternatively, the inventive data storing and reproducing apparatus 2 may start reproducing the music data after acquiring the entire data.

In the foregoing description, the CPU 53 was shown to carry out the procedure for music data selection upon screen transition and the procedure for music data selection upon focused position transition on the basis of the web browser program stored beforehand in the ROM 54 or on the HDD 55. Alternatively, the CPU 53 may execute the procedure for music data selection upon screen transition or the procedure for music data selection upon focused position transition in keeping with the web browser program installed from diverse storage media including CD-ROM (Compact Disc-Read Only Memory), DVD-ROM (Digital Versatile Disc-Read Only Memory) and semiconductor memory.

In the foregoing description, the data processing unit 60 serving as the reproducing device and the CPU 53 acting as the selecting, detecting, and reproduction controlling device were shown primarily to constitute the data storing and reproducing apparatus 2. However, this is not limitative of the present invention. An alternatively structured data storing and reproducing apparatus may be constituted by other suitable devices designed for reproduction, selection, detection and reproduction control purposes.

It should be understood by those skilled in the art that various modifications, combinations, sub-combinations and alterations may occur depending on design requirements and other factor in so far as they are within the scope of the appended claims or the equivalents thereof.

What is claimed is:

1. A content data reproducing method of a reproducing apparatus, comprising:
    selecting a first webpage by a user operating an operation input unit;
    reproducing, by the reproducing apparatus, a first music data linked to the first webpage;
    transitioning to a second webpage in response to a request to select the second webpage, the request being input by a user operating the operation input unit;
    determining whether a second music data is linked to the second webpage;
    determining, by a processor, whether the second music data is identical to the first music data currently being reproduced by the reproducing apparatus, based on information about the first music data linked to the first webpage and information about the second music data linked to the second webpage, when the second content is determined to be linked to the second webpage;
    reproducing, continuously by the reproducing apparatus, the first music data linked to the first webpage, after selection of the second webpage, when the second music data linked to the second webpage is determined to be identical to the first music data linked to the first webpage; and
    stopping reproduction of the first music data linked to the first webpage and reproducing the second music data linked to the second webpage, when the second music data linked to the second webpage is determined to be different from the first music data linked to the first webpage.

2. The reproducing method according to claim 1, wherein the first webpage and the second webpage include page information displayed as screens.

3. The reproducing method according to claim 1, wherein the first webpage and the second webpage include screen structure information included in page information to be displayed as screens.

4. The reproducing method according to claim 3, wherein the screen structure information includes information about selection buttons by which to request reproduction of content data.

5. The reproducing method according to claim 1, wherein the reproducing the first music data linked to the selected first webpage comprises acquiring, externally, the first music data linked to the first webpage and reproducing the acquired first music data in a streaming mode.

6. The reproducing method according to claim 1, wherein the determining, by the processor, whether the second music data is the same as the first music data comprises determining whether the second music data is identical to the first music data based on addresses representative of locations where the first music data linked to the first webpage and the second music data linked to the second webpage are stored.

7. The reproducing method according to claim 1, wherein the determining, by the processor, whether the second music data is identical to the first music data comprises determining whether the second music data is identical to the first music data based on attribute information about the first music data linked to the first webpage with attribute information about the second music data linked to the second webpage.

8. The reproducing method according to claim 7, wherein the attribute information includes titles of the first and second music data.

9. The reproducing method according to claim 1, further comprising:
stopping, when the second music data is not determined to be linked to the second webpage, the reproducing of the first music data linked to the selected first webpage.

10. A music data reproducing apparatus including a processor, comprising:
an operation input unit configured to select data items;
a reproduction unit configured to reproduce a first music data linked to a selected first webpage;
a selection unit configured to select a second webpage in response to a request to select the second webpage, the request being input by a user operating the operation input unit;
a determination unit configured to determine whether a second music data is linked to the second webpage; and
a reproduction control unit configured to determine, when the second music data is determined to be linked to the second webpage by the determination unit, whether the second music data currently being reproduced by the reproduction unit is identical to the first music data, based on information about the first music data linked to the first webpage and information about the second music data linked to the second webpage, wherein,
the reproduction unit is configured to continuously reproduce the first music data linked to the first webpage, after selection of the second webpage, when the reproduction control unit determines that the second music data linked to the second webpage is identical to the first music data linked to the first webpage, and
the reproduction unit is configured to stop reproduction of the first music data linked to the first webpage and reproduce the second music data linked to the second webpage, when the reproduction control unit determines that the second music data linked to the second webpage is different from the first music data linked to the first webpage.

11. A non-transitory computer-readable storage medium having embedded therein instructions, which when executed by a processor, cause the processor to perform a method of a reproducing apparatus for reproducing content data comprising:
selecting a first webpage by a user operating an operation input unit;
reproducing, by the reproducing apparatus, a first music data linked to the selected first webpage;
selecting a second webpage in response to a request to select the second webpage, the request being input by a user operating the operation input unit;
determining whether a second music data is linked to the second webpage;
determining, when the second music data is determined to be linked to the second webpage, whether the second music data currently being reproduced by the reproducing apparatus is identical to the first music data, based on information about the first music data linked to the first webpage and information about the second music data linked to the second webpage;
reproducing, continuously by the reproducing apparatus, the first music data linked to the first webpage, after selection of the second webpage, when the second music data linked to the second webpage is determined to be identical to the first music data linked to the second webpage; and
stopping reproduction of the first music data linked to the first webpage and reproducing the second music data linked to the second webpage, when the second music data linked to the second webpage is determined to be different from the first music data linked to the first webpage.

12. The reproducing apparatus according to claim 10, wherein the reproduction unit is configured to stop reproduction of the first music data linked to the first webpage, when the reproduction control unit determines that the second music data is not linked to the second webpage.

13. The computer-readable storage medium according to claim 11, further comprising:
stopping reproduction of the first music data linked to the first webpage, when the second music data is determined not to be linked to the second webpage.

* * * * *